April 4, 1939.  J. H. ROUSE  2,153,529
MECHANICAL SOUND RECORD IN FILM
Filed Sept. 6, 1935
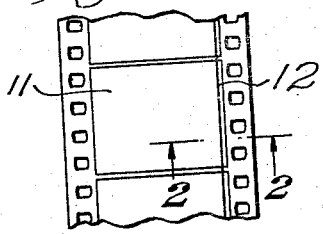
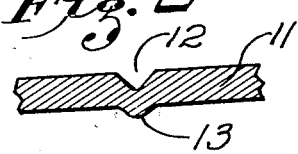
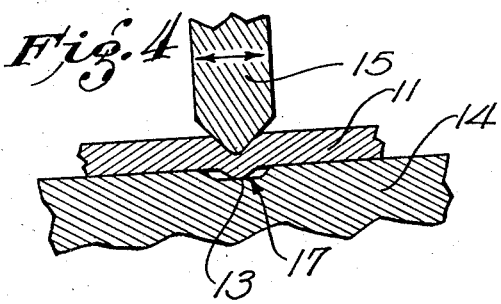
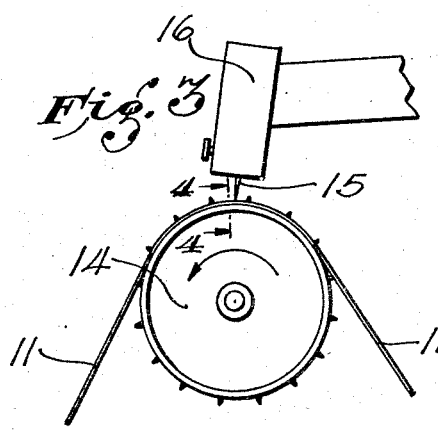
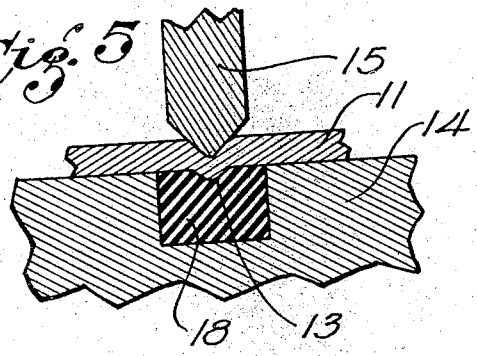
INVENTOR
John H. Rouse.

Patented Apr. 4, 1939

2,153,529

UNITED STATES PATENT OFFICE 2,153,529

MECHANICAL SOUND RECORD IN FILM

John H. Rouse, Los Angeles, Calif., assignor to S. A. Sollie, Los Angeles, Calif.

Application September 6, 1935, Serial No. 39,451

2 Claims. (Cl. 274—11)

This invention relates to a mechanical record of sound and means for producing it. In particular, the invention comprehends a mechanical record of sound produced in ordinary motion picture film or the like.

An important object of the invention is to provide a mechanical sound record in motion picture film, or the like, which will be durable in use for reproduction of the sound, and which is not limited in depth to the thickness of the film.

A further object of the invention is to provide a mechanical sound record that may be produced in film that has the positive picture already developed thereon.

Other objects and advantages of the invention will be apparent during the course of the following description.

Sound has been recorded mechanically on motion picture film by cutting a phonic line or groove near the edge of the film. As ordinary film is only about .006 inch thick, even with a shallow groove, the film is cut about half-way through and so there is a likelihood of the film cracking at the groove with handling. Also, the thinness of the film does not permit cutting a groove deep enough to give reasonable safety from the needle jumping the groove in the reproduction of the sound.

In the present invention a phonic line or groove is produced without substantially removing any of the material of the film. The groove is swaged or creased in the film by the recording stylus so that the material displaced protrudes on the opposite side of the film from the groove.

Referring to the drawing:

Figure 1 is a view in plan showing a fragmentary length of motion picture film to which the sound record has been added;

Figure 2 is an enlarged, fragmentary cross section of Fig. 1 along line 2—2, showing the area around groove 12;

Figure 3 is a fragmentary side elevation of the recording and/or reproducing system;

Figure 4 is an enlarged, fragmentary cross section of Fig. 3 along line 4—4;

Figure 5 is a similar view to Fig. 4, but shows a modified form of roller.

At 12 in Fig. 1 is shown the phonic line which may be located at any convenient distance from the edge of the film or the sprocket holes and may be omitted in the projection of the picture by a mask in the projector. The magnified cross section view of the area around the phonic groove in Fig. 2 shows the swaged or creased groove 12 with the material displaced at 13. At 14 is shown a sprocket or roller for supporting and driving the film at constant speed while it is being recorded or reproduced. 15 is a stylus or needle actuated by the sound frequencies through the electro-magnetic, or similar, head 16.

The magnified cross section view of Fig. 4 shows the formation of the sound record. The stylus 15 has a smooth, conical-shaped end with slightly rounded point which bears against the film and presses it into the groove 17 in the roller. The stylus may preferably be a jewel. The pressure on the stylus may be regulated by weighting sure on the stylus-holding head or the arm carrying it, or by similar means. The bottom of the groove 17 forms a stop, limiting the depth of the groove formed in the film by the stylus. The groove 17 is made wide enough to permit lateral movement of the stylus in the directions of the arrows on same. This side movement produces the sound modulation of the groove in accordance with the sound-frequency-actuated motion of the stylus produced by the driving head while recording sound.

At 18 in Fig. 5 is shown a recess filled with a resilient material such as rubber. This has a similar function to the groove 17 and is an alternative means for permitting the creasing or swaging of the film by the recording stylus.

Reproduction of sound from such a record is by a similar method to the recording except that the stylus is then actuated by the modulation of the phonic line instead of producing it. The recording and reproducing methods are so well known that they will not be further described here. As is common in other forms of film recording, the "sound" is displaced a definite number of frames from the picture.

The advantages of this invention may be realized by consideration of the film in which the record is made. The film is relatively soft and so a large surface contact of the reproducing stylus is necessary to prevent excessive wear. This requires a relatively large, deep groove. On account of the thinness of the film, this is not possible with a cut groove. But, by this invention, no appreciable material is lost in the formation of the groove and the material surrounding the walls of the groove is toughened by the deformation of it. The groove can also be made deep enough so that there is less danger of the stylus jumping the groove in reproduction, even with greater amplitude of modulation than is usual. This invention is particularly valuable when it is desired to add "sound" to film that already bears the positive picture.

In the foregoing description, lateral modulation of the phonic groove has been considered, but it will be understood that vertical or "hill and dale" modulation of the groove may be produced by moving the stylus up and down instead of laterally in accordance with the sound. A swaged or creased phonic groove with vertical modulation will be formed. The recording system shown in Fig. 5 is particularly adapted to vertical recording.

While I have described the principle of operation of my invention together with the apparatus which I now consider to represent the best embodiment thereof, it will be apparent that various other modifications may be made without departing from the spirit and scope of my invention, which modifications I aim to cover by the appended claims.

I claim:

1. In a system for forming a sound record in motion picture film, a roller to support and drive said film, said roller having an annular recess at least one millimeter deep filled with a resilient material such as rubber, a smooth pointed stylus mounted above said film and said recess so as to press said film into said material, and means for modulating said stylus in accordance with sound frequencies.

2. Apparatus for producing a sound record in film in the form of a phonic groove depressed in said film so that substantially all the material displaced by the formation of said groove protrudes on the other side of said film from said groove comprising recording means including a smooth round-pointed stylus and a support for said film having a recess at least one millimeter deep, filled with a resilient material such as rubber, permitting and limiting the depression of said groove by said stylus.

JOHN H. ROUSE.